(No Model.)

G. P. CAMPBELL.
CAR BRAKE.

No. 391,837. Patented Oct. 30, 1888.

Attest
W. C. Spielman
G. D. Spielman

Inventor
George P. Campbell
By Geo. J. Murray
Atty.

United States Patent Office.

GEORGE P. CAMPBELL, OF CINCINNATI, OHIO, ASSIGNOR TO THE FRICTION CAR BRAKE COMPANY, OF EAST ST. LOUIS, ILLINOIS.

CAR-BRAKE.

SPECIFICATION forming part of Letters Patent No. 391,837, dated October 30, 1888.

Application filed August 21, 1885. Serial No. 174,939. (No model.)

*To all whom it may concern:*

Be it known that I, GEORGE P. CAMPBELL, a citizen of the United States, and a resident of Cincinnati, in the county of Hamilton and State of Ohio, have invented certain new and useful Improvements in Car-Brakes, of which the following is a specification.

The object of this invention is an improved means of operating automatic car-brakes. It is an improvement upon the invention shown in my patent, No. 317,088, dated May 5, 1885.

It consists in an improved clutch for attachment to the car-axle, and means for operating the same to throw the brakes on or off.

The invention will be first fully described in connection with the accompanying drawings, and then particularly pointed out in the claims.

Figure 1:
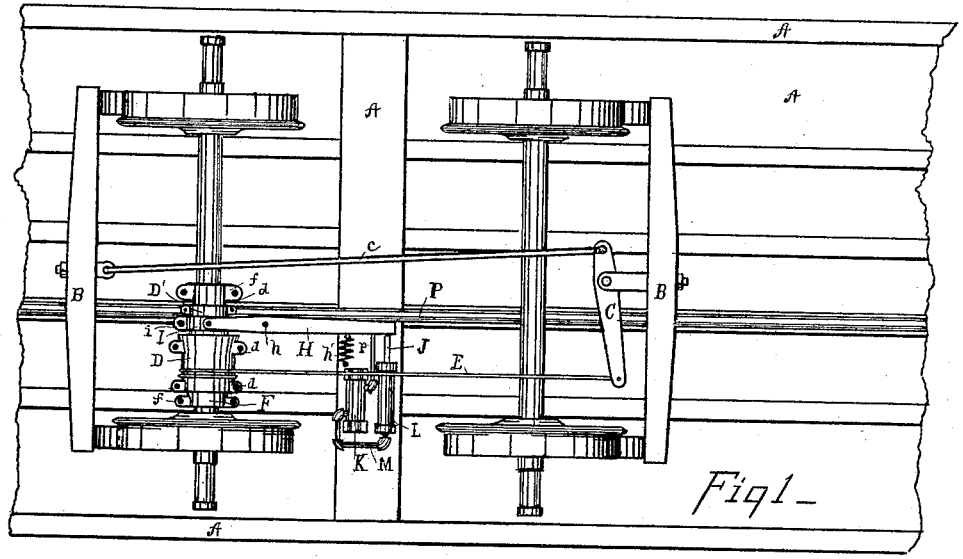
Figure 2:
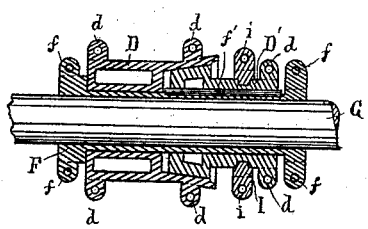
Figure 3:
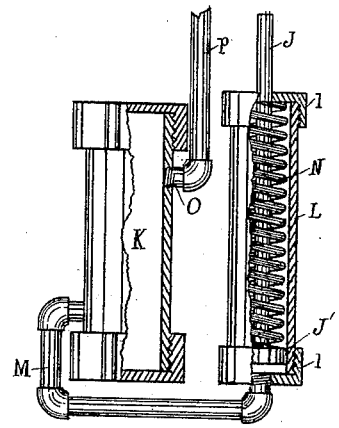

In the drawings, in which like parts are indicated by similar reference-letters wherever they occur throughout the various views, Figure 1 is an inverted plan view of a portion of a railway-car provided with my improvements. Fig. 2 is a radial section of the clutch with a portion of the axle upon which it is mounted shown in elevation. Fig. 3 is a view partially in side elevation and partially in radial section of my improved device, which is operated by atmospheric pressure to actuate the lever which couples the clutch.

The lower timbers of the car-body are represented by A.

B represents the ordinary brake-beams, and C one of the ordinary brake-levers fulcrumed in a clip secured to one of the beams in the usual manner, and having its short arm connected to an eyebolt in the opposite beam by the customary connecting-rod c. The opposite arm of the lever is coupled to a loose member, D, of the friction clutch—preferably by a rope cable, E.

The friction-clutch, which consists of the loose member D and the sliding member D', is made, preferably, in two parts, and has projecting lugs d to receive bolts, by which the members are secured together around a sleeve, F, which is similarly divided to pass around and be firmly clamped and held upon the axle G by screw-bolts passing through lugs f upon the sleeve members. The object of this arrangement of the clutch is to provide a smooth journal for the loose member D of the clutch without dressing off the axle for that purpose, and also to permit the clutch to be applied to any of the axles now in common use without necessitating the removal of the wheel. The sleeve F is coupled to the sliding member D' of the clutch by a spline, f', which enters longitudinal grooves in both the sleeve F and sliding member D' of the clutch.

The lever H, which couples and uncouples the clutch, is fulcrumed at h to some stationary object depending from the bottom of the car. Its end is bifurcated or formed into a spade-handle to connect on opposite sides to a strap, I, which is also made in two parts bolted together through projecting lugs i around the sliding member D' of the clutch. The strap has a rib extending around on the inside, which enters a circumferential groove in the member D', so that when the lever is moved in either direction the clutch D' is compelled to move with it. The outer arm of the lever H is held in contact with the plunger J by a spiral spring, h'.

The plunger on rod J is a part of my improved device for operating the brake by atmospheric pressure, which device I will now describe. This device consists of two closed cylinders, K L, which are connected together by a pipe, M. The cylinder L is provided with a piston, J', the rod J of which projects out through one of the caps l to bear against or be connected with the clutch-lever H. Between the cap l and the plunger is coiled a spiral spring, N, which holds the piston in the position shown when the atmospheric pressure is released. The cylinder K has also a pipe, O, screwed into its other end, to which is coupled the customary hose or air-tube now commonly used on air-brakes. The cylinder K is filled, or partially filled, with glycerine, oil, or similar liquid, which, when the air is forced into the cylinder K, is forced through the tube M into the cylinder L, and thus forcing forward the piston J' and its rod J, which throws the sliding member D' of the clutch into frictional contact with its opposite member, D, and throws on the brakes. When the air-pressure is released, the piston will be thrown back in the position shown, the liquid returned to the cylinder K, and the clutch uncoupled. The two cylinders K and L are placed side by side and connected by the pipe M, for convenience in attaching them to the timbers of the car; but the same result would be accomplished by placing them in the same plane or by lengthening the cylinder L and connecting the air-pipe or hose P to the pipe M.

I have shown the customary hose P extending longitudinally under the car, and a branch, p, passing from this to the pipe O. It is of course understood that all the brakes of the train are thrown on simultaneously. I have simply shown one truck, which fully illustrates the principle of my invention. It should be understood, also, that the ordinary brake-staff and its rod may be connected to the brake-lever, so that the cars with my attachment may be used as the ordinary cars are now used, as I do not contemplate any change in the brake-beam, shoes, brake-lever, or other attachments.

Instead of having the rod J held against the lever by the spiral spring h', the same result would be accomplished by coupling the end of the lever H with the end of the rod. The spring N would then throw the clutch out of gear when the air-pressure was released. It is also evident that if I desire to make my brakes operate automatically should any of the cars become detached from the train, it would only be necessary to have a spring pressing the end of the lever and normally holding the clutch in gear, and to use the air-pressure for throwing and holding the clutch out of gear and holding the brakes off.

What I claim is—

1. A sleeve formed in two parts to embrace and be secured to the car-axle and forming a bearing for a rope-drum and friction clutch, substantially as specified.

2. In a car-brake, the combination of sleeve F, made in two parts diametrically divided to be firmly clamped upon the car-axle, the clutch members D D', also made in two parts and similarly divided, the part D constructed to be firmly secured upon said sleeve and the part D' to revolve freely thereon; with the brake mechanism of a car and a cable, as E, having one end secured to the sliding member D' and the opposite end to the brake-lever, substantially as specified.

3. The combination, substantially as specified, of the pipes P, an air-brake mechanism, a car-brake mechanism of ordinary construction, as shown, and a cable connecting the brake-lever of said mechanism with a friction-clutch actuated by the car-axle, with cylinders K L, pipes M and O, spring N, piston-rod J, and piston J', located intermediate the pipe P and clutch-lever, said pipe O being connected to pipe P, and the rod J arranged to operate the clutch-lever, for the purpose set forth.

4. In a car-brake mechanism of the character described, the combination, substantially as specified, of the liquid-cylinder K, the piston-cylinder L, the pipe M, connecting said cylinders, the air-pipe O, the piston J', its rod J, and spring N.

5. The combination, with a car-axle, a clutch adapted to be revolved thereby, a cable connecting the clutch with the brakes, and a shifter-lever for the clutch, of a pressure-cylinder, a piston therefor to actuate said lever, and means for supplying compressed fluid to said cylinder, substantially as shown and described.

6. The combination, with a car-axle, a clutch adapted to be revolved thereby, a cable connecting the clutch with the brakes, and a shifter-lever for the clutch, of a pressure-cylinder, a piston therefor; and a spring acting upon said lever in opposition to said piston, and means for supplying compressed fluid to said cylinder, substantially as shown and described.

GEORGE P. CAMPBELL.

Witnesses:
C. W. MILES,
GEO. J. MURRAY.